United States Patent [19]

Lauck et al.

[11] Patent Number: 5,307,355
[45] Date of Patent: Apr. 26, 1994

[54] METHOD AND APPARATUS FOR GENERATING A 48-BIT FRAME CHECK SEQUENCE

[75] Inventors: Anthony G. Lauck, Wellsley, Mass.; Ian M. C. Shand, Cobham; John Harper, Reading, both of England

[73] Assignee: Digital Equipment International Limited, Fribourg, Sweden

[21] Appl. No.: 647,959

[22] Filed: Jan. 30, 1991

[30] Foreign Application Priority Data

Feb. 6, 1990 [GB] United Kingdom ............... 9002643

[51] Int. Cl.$^5$ ............... G06F 11/10; H03M 13/00
[52] U.S. Cl. ...................... 371/37.1; 371/53
[58] Field of Search ............ 371/37.1, 53, 54

[56] References Cited

U.S. PATENT DOCUMENTS

| | | | |
|---|---|---|---|
| 3,439,329 | 4/1969 | Betz | 371/37.1 |
| 3,689,899 | 9/1972 | Franaszek | 371/37.1 X |
| 3,872,430 | 3/1975 | Boudreau | 371/37.1 |
| 4,468,770 | 8/1984 | Metcalf et al. | 371/42 |
| 4,502,141 | 2/1985 | Kuki | 371/37.1 |
| 4,628,504 | 12/1986 | Brown | 370/85 |
| 4,646,235 | 2/1987 | Hirosawa et al. | 364/200 |
| 4,712,215 | 12/1987 | Joshi et al. | 371/37 |
| 4,723,243 | 2/1988 | Joshi et al. | 371/37 |
| 4,727,495 | 2/1988 | Cheetham et al. | 364/514 |
| 4,809,273 | 2/1989 | Jackowski | 371/37.1 X |
| 5,046,069 | 9/1991 | Calvignac | 371/53 |
| 5,121,396 | 6/1992 | Irvin | 371/53 |
| 5,130,991 | 7/1992 | Takano | 371/53 |

FOREIGN PATENT DOCUMENTS

| | | |
|---|---|---|
| 0200124 | 11/1986 | European Pat. Off. |
| 0225761 | 6/1987 | European Pat. Off. |
| 0313707 | 5/1989 | European Pat. Off. |
| 0317683 | 5/1989 | European Pat. Off. |
| 2094041 | 9/1982 | United Kingdom |

OTHER PUBLICATIONS

Maholick et al., A universal cyclic division circuit, Fall Joint Computer Conference 1971, pp. 1-8.

Primary Examiner—Robert W. Beausoliel, Jr.
Assistant Examiner—Glenn Snyder
Attorney, Agent, or Firm—Kenneth F. Kozik; A. Sidney Johnston; Albert P. Cefalo

[57] ABSTRACT

A node operating in a network using the International Standard Organization (ISO) High-Level Data Link Control (HDLC) network protocol includes a mechanism for encoding information such that frames including the encoded information can be correctly interpreted by nodes operating in either of the standard 16-bit or 32-bit ISO-HDLC operating modes. The encoding mechanism produces a preliminary frame check sequence by encoding the information in an encoder using a generator polynomial $G_{48}(x)$, which is a combination of the generator polynomials $G_{16}(x)$ and $G_{32}(x)$ which are used to produce frame check sequences for nodes operating in 16-bit or 32-bit modes, respectively. Before the information is encoded, the encoding mechanism sets the encoder to an initial condition using an initializing polynomial $I_{48}(x)$. The preliminary frame check sequence is further encoded by adding to it a complementing polynomial $C_{48}(x)$. The result is a 48-bit frame check sequence. The encoding mechanism appends the 48-bit frame check sequence to the information, and transmits the information and the appended 48-bit frame check sequence over the network as part of a frame.

14 Claims, 6 Drawing Sheets

XID FRAME WITH MARKER

METHOD AND APPARATUS FOR GENERATING A 48-BIT FRAME CHECK SEQUENCE

FIELD OF THE INVENTION

The invention relates to the field of computer networks. More particularly the invention relates to the initializing of network communication links.

BACKGROUND OF THE INVENTION

A computer network enables various devices, such as processors, mass storage devices, and printers to communicate with each other over high speed bi-directional communication links. The devices are connected, that is, interfaced, to the network, and thus transfer data to and from the network, through nodes. The nodes are interconnected by the communication links, with one node on either end of the link.

Data and control messages are transmitted over the network communication links in the form of frames. A frame is a stream of bits in a particular format. In contains, in addition to the data or control message, network specific information, such as the identity of the transmitting node or the identity of the node and/or the connected device to which the frame is directed.

A frame is sectioned into various fields, such as an information field, an address field, etc. It begins with a beginning-of-frame flag field, which is a field containing a predetermined number of bits set in a specific pattern, and it ends with an end-of-frame flag field. The fields between the beginning-of-frame flag and the end-of-frame flag are collectively referred to as the frame message.

The frame also contains error detection information which enables a receiving node to determine if the frame message is error-free. The error detection information, commonly referred to as a frame check sequence, is placed in a frame check sequence field and transmitted as part of the frame.

Each node receiving a frame manipulates the information between the two flags to determine if the frame message is error-free. If the node determines that the frame is error free, it may then use the frame data or control message, as appropriate, and/or re-compute the frame check sequence and transmit the frame over a communication link to a next node.

One technique for manipulating a frame and the associated frame check sequence is disclosed in U.S. Pat. No. 3,872,430 to Boudreau, et al., which is assigned to International Business Machines Corporation (IBM). Basically, a node receiving a frame manipulates the entire frame, including the frame check sequence, by encoding the information using the same code which was used earlier to generate the frame check sequence. Specifically, the node detects the flag that signifies the beginning of the frame message and encodes all the information between the detected flag and the flag signifying the end of the frame message. If the encoding results in a predetermined number, the node determines that the frame is error-free.

Nodes in networks using the International Standard Organization (ISO) High-Level Data Link Control (HDLC) network protocol may operate using one of two modes of operation, namely, a 16-bit mode or a 32-bit mode. [For more information relating to the modes of operation see ISO Standard 3309 sections 3.6.2-3.6.3] Some nodes are capable of operating in either mode while some nodes may operate in only one of the two modes. When a node computes the frame check sequence it uses ISO standard code designed for either the 16-bit mode or the 32-bit mode. In order that a receiving node may interpret the frame check sequence correctly, the transmitting node and the receiving node must be operating in the same mode.

Each time a communication link is initialized, a notification/negotiation takes place between the nodes at either end of the link in order to establish the mode in which the nodes will operates over the link. The nodes cannot transmit data or control frames over the link until the operating mode for the link is established. Thus the link is essentially useless until the operating mode is set.

The nodes notify each other of their preferred mode of operation, that is, either 16-bit or 32-bit, by sending an XID (exchange identification) frame over the communications link. The XID frame contains the operating mode information as well as information concerning certain other operating characteristics of the originating node such as the identity of the node. The XID frames contain frame check sequences, also, A node receiving an XID frame tries to check the validity of the frame message using the frame check code associated with the node's preferred mode of operation. Thus the node, operating in a particular mode, for example, the 16-bit mode, manipulates the XID frame message using an ISO frame check code designed for the 16-bit mode. If the frame contains a frame check sequence corresponding to the 32-bit mode, however, the node cannot verify the frame message. If the frame cannot be verified, the node may either ignore it an wait for a valid XID frame or start a negotiation with the transmitting node. A node which has sent an XID frame and not received an appropriate response may similarly transmit another XID frame or start a negotiation.

What is needed is a mechanism which allows nodes operating in either of the two ISO modes or operation to inform each other of their operating characteristics. Thus, for example, a node operating in 32-bit mode which receives an XID frame from a node operating in 16-bit mode will be able to interpret the frame correctly and the nodes can then easily initialize their common communication link.

SUMMARY OF THE INVENTION

The invention is an improved node which is capable of encoding frame fields to generate a 48-bit frame check sequence. The 48-bit frame check sequence can be interpreted correctly by nodes either of the two ISO modes of operation, namely, the 16-bit mode or the 32-bit mode.

In brief summary, the node encodes the frame fields consisting of k bits by using a frame check code having the following generator polynomial:

$$G_{48}(x) = x^{48} + x^{44} + x^{42} + x^{39} + x^{37} + x^{35} + x^{34} + x^{31} +$$

$$x^{28} + x^{23} + x^{19} + x^{18} + x^{17} + x^{15} + x^{14} + x^{12} + x^{11} +$$

$$x^9 + x^8 + x^6 + x^4 + x^2 + x + 1.$$

First, the node sets an encoder to an initial condition using an initializing polynomial, $I_{48}(x)$:

$$x^{47} + x^{46} + x^{43} + x^{42} + x^{39} + x^{37} + x^{34} + x^{32} + x^{31} + x^{30} +$$

$$x^{29} + x^{27} + x^{25} + x^{23} + x^{22} + x^{21} + x^{20} + x^{19} + x^{17} + x^{16} +$$

-continued $$x^{15} + x^{11} + x^{10} + x^9 + x^8 + x^5 + x^4 + x^2 + x + 1.$$

Next, the node encodes the frame in the initialized encoder using the generator polynomial $G_{48}(x)$ to generate a preliminary frame check sequence. The node then further encodes the preliminary frame check sequence by adding to it a second, complementing polynomial, $C_{48}(x)$:

$$x^{45} + x^{44} + x^{41} + x^{40} + x^{38} + x^{36} + x^{35} + x^{33} + x^{31} + x^{30} +$$
$$x^{29} + x^{27} + x^{25} + x^{23} + x^{22} + x^{21} + x^{20} + x^{19} + x^{17} + x^{16} +$$
$$x^{14} + x^{13} + x^{12} + x^7 + x^6 + x^3.$$

The result is a 48-bit frame check sequence which can be interpreted correctly by nodes operating in either of the 32-bit or 16-bit modes of operation. The 48-bit frame check sequences then becomes the frame check sequence field and the frame is transmitted.

A node receiving a frame containing the 48-bit frame check sequence encodes the entire frame using either the ISO standard 32-bit frame check code or the standard 16-bit frame check code. Thus the node appropriately initializes its encodes and encodes the k-bit frame message and the appended 48-bit frame check sequence. If the frame information is error-free, the result of the encoding is a predetermined standard remainder associated with the frame check code used by the receiving node to encode the received frame.

A node operating in 32-bit mode thereafter treats the frame message as $k+16$ bits long while a node operating in the 16-bit mode treats the frame message as $k+32$ bits long. A marker may be placed between the end of the data and the beginning of the frame check sequence, if necessary, to signify the start of the 48-bit frame check sequence. The node may then, after determining that the frame is error-free, ignore the marker and any bits following it.

BRIEF DESCRIPTION OF THE DRAWINGS

The above and further advantages of the invention may be better understood by referring to the following description in conjunction with the accompanying drawings, in which.

DETAILED DESCRIPTION

Figure 1:
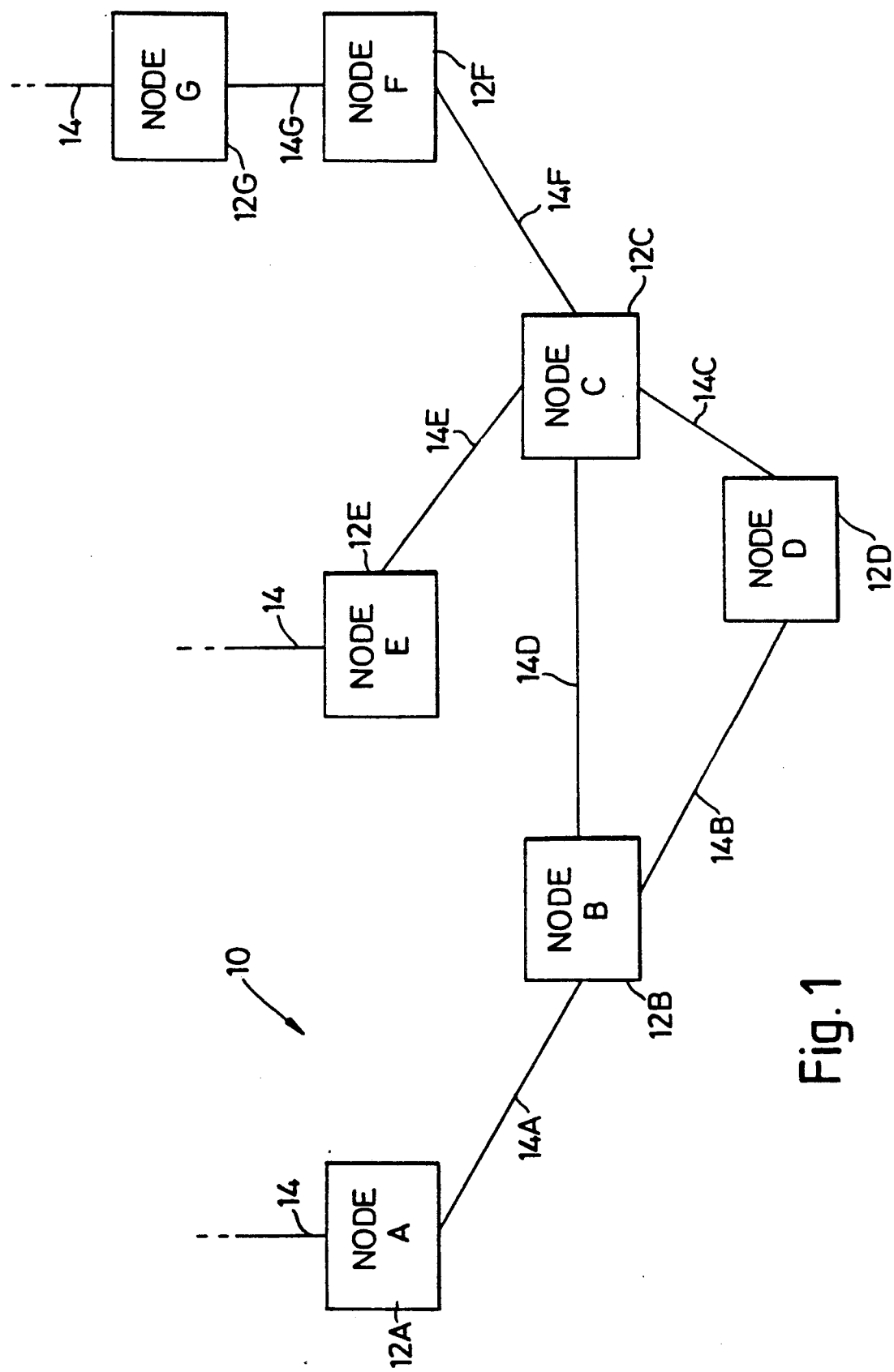
FIG. 1 is an illustration of a network.

FIG. 1 depicts a network 10. The network 10 includes nodes 12A-12G interconnected by communication links 14A-G. Various nodes 12 operate with one or more devices, such as mass storage devices, data processors, terminals, etc. (not shown), connecting the devices to the network and enabling them to communicate.

The network nodes 12 operate using the International Standard Organization (ISO) standard High-Level Data Link Control (HDLC) protocol. The HDLC protocol allows nodes 12 to operate in one of two modes of operation, namely, a 16-bit mode or a 32-bit mode. Thus nodes operating using the 32-bit mode of operation, typically the nodes of relatively recent vintage, may operate on the same network as nodes using the 16-bit mode of operation, typically the nodes of older vintage. Some nodes are capable of operating in either of the two modes. These nodes may thus communicate with both the older and the newer nodes.

Before a node 12 can transmit data over a communication link 14 the link must be initialized. During initialization the transmitting node 12 and the node 12 at the other end of the communication link 14 must agree on a mode of operation. For example, the nodes 12 may agree to operate in 32-bit mode if both nodes 12 support this mode of operation.

In order to establish the mode of operation for the link 14 the nodes 12 exchange identifying information, including the preferred mode of operation. Nodes 12 send information over the link 14 in the form of frames, that is, streams of bits in specified formats. Thus, to initialize the link 14, a node 12 sends over the link 14 an XID (exchange information) frame specifying its preferred mode of operation as well as other network specific initializing information.

Figure 2:
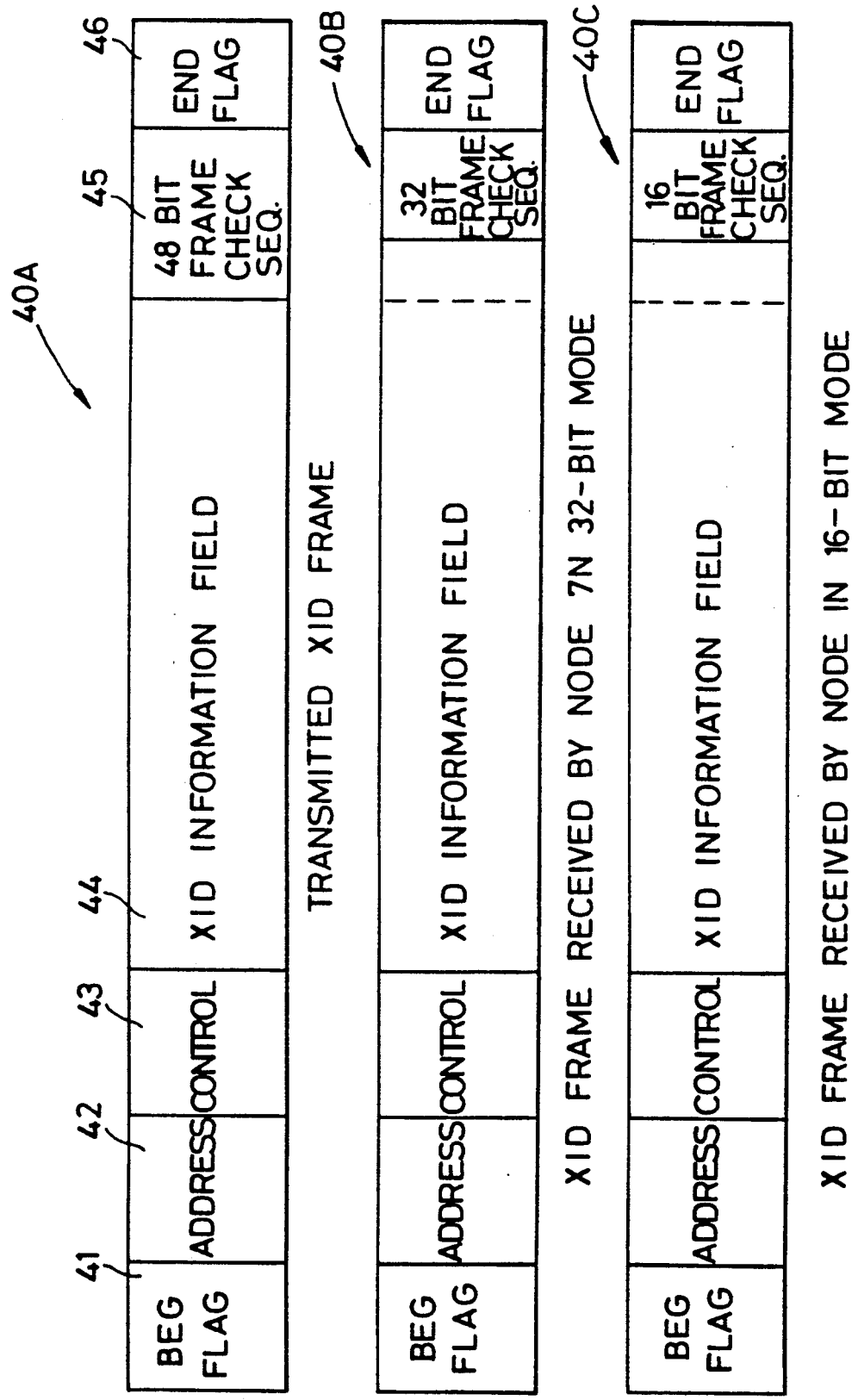
FIG. 2 depicts three views of an XID frame.
Figure 2A:
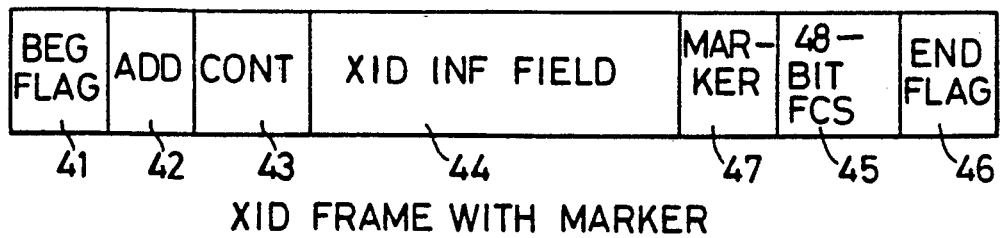
FIG. 2A depicts an XID frame with marker.

FIG. 2 depicts the format of an XID frame 40A, which is sectioned into various fields 41-46. The XID frame 40A starts with a beginning-of-frame flag field 41, which contains a flag, that is, a predetermined number of bits set in a specific pattern, denoting the beginning of a frame. Following the beginning-of-frame flag field 14 is an address field 42, which contains addressing information. The next field is a frame control field 43. The contents of this field inform a receiving node that the frame is an XID frame.

An XID information field 44 follows the frame control field 43. The XID information field 44 contains the data or control information. This field may contain any number of bits up to a predetermined maximum. The XID information field 44 contains, for example, the information detailing the preferred mode of operation of the node. A frame check sequence field 45 contains an error detection sequence used by the receiving stations to detect errors in any of the address field 42, the frame control field 43 and the XID information field 44. The end of the frame is denoted by an end-of-frame flag field 46. The fields 41-44 between the beginning-of-frame flag field 41 and the end-of-frame flag field 46, that is, all the frame fields except the frame check sequence field 45, are collectively referred to as the frame message.

As is understood by those skilled in the art, two frames must be separated by at least one flag. Thus the end-of-frame flag of one frame may serve as the beginning-of-frame flag for the next frame. As is further understood by those skilled in the art, ZERO bits may be inserted, as necessary, in the various fields after the frame check sequence is calculated to ensure that the information in the fields can be readily distinguished from the flags, that is, that the bit patterns in the various fields are significantly different than the bit patterns of the flags. This is commonly referred to as "bit stuffing". A receiving node removes these ZERO bits before it checks the validity of the frame.

When a node 12 sends an XID frame 40A it encodes the frame address, control and information fields 42-44 using a frame check code to generate a 48-bit frame check sequence. The 48-bit frame check sequence appears in the frame in the frame check sequence field 45. The frame check code and the encoding of the various fields is discussed in more detail below with reference to FIGS. 3–4.

When a node receives an XID frame 40 it views the frame as containing either a 32-bit (40B) or a 16-bit (40C) frame check sequence, depending on the mode in which the node is then operating. The node encodes all the information in the received frame including the frame check sequence, that is, all of the information between the beginning-of-frame flag and the end-of-frame flag fields 41 and 46, using the ISO standard frame check code corresponding to the operation mode. If the encoding results in the ISO standard remainder associated with the frame check code, the node determines that the frame is error-free. If the frame is error-free the node may then use the frame message, which includes the preferred mode of operation information, to initialize the communication link.

As is understood by those skilled in the art, the ISO standard HDLC protocol establishes the frame check codes, including generator polynomials and initializing and complementing polynomials, used in the 16-bit and the 32-bit modes of operation. Following the ISO standard, a node operating in 32-bit mode encodes the XID frame message, $M_k$, that is, the frame address, control and information fields to produce a frame check sequence, $F_{32}(x)$, by: (1) initializing an encoder with the initializing polynomial $I_{32}(x)$; (2) encoding the frame message, $M_k$, by using the generator polynomial $G_{32}(x)$, thereby generating a preliminary frame check sequence; and (3) adding (XOR'ing) to the preliminary frame check sequence the complementing polynomial $C_{32}(x)$.

A node operating in 16-bit mode similarly encodes a frame message to generate a 16-bit frame check sequence by using the initializing, generating and complementing polynomials associated with the 16-bit frame check code.

When a node operating, for example, in the 32-bit mode, receives an XID frame it encodes the frame message fields by using the ISO standard initializing and generator polynomials. Thus the node encodes the frame message by: (1) initializing an encoder using the initializing polynomial $I_{32}(x)$; and (2) encoding the frame using the generator polynomial $G_{32}(x)$. The result is a 32-bit remainder value, $R(x)$. The mode then compares the generated frame remainder, $R(x)$, with a predetermined number associated with the 32-bit frame check code, $R_{32}(x)$, which is (modulo $G_{32}(x)$):

$$C_{32}(x) * x^{32}$$

If the remainder $R(x)$ equals $R_{32}(x)$ the node determines that the frame is error-free. Thus a node receiving an XID frame determines that the frame is error-free if the frame message encodes to form the appropriate standard remainder, namely, $R_{32}(x)$ or $R_{16}(x)$. The remainder $R_{16}(x)$ is (modulo $G_{16}(x)$):

$$C_{16}(x) * x^{16}$$

In order for a frame including a frame check sequence generated by using a particular frame check code to be interpreted correctly by both a node operating in the 16-bit mode and a node operating in the 32-bit mode, it must encode to the standard 32-bit remainder, $R_{32}$, when it is encoded by a node using the standard 32-bit polynomials and it must also encode to the standard 16-bit remainder, $R_{16}$, when it is encoded by a node using a standard 16-bit polynomials. To satisfy these conditions, a 48-bit frame check code is used.

The 48-bit frame check code generator polynomial, $G_{48}(x)$, is a combination of the standard generator polynomials for the 16-bit code and the 32-bit code:

$$G_{48}(x) = G_{16}(x) * G_{32}(x)$$

The initializing polynomial, $I_{48}(x)$, and the complementing polynomial, $C_{48}(x)$, for the 48-bit frame check code must satisfy the following equations:

$$I_{48}(x) \text{ modulo } G_{16}(x) = I_{16}(x) * x^{32}$$

$$I_{48}(x) \text{ modulo } G_{32}(x) = I_{32}(x) * x^{16}$$

$$C_{48}(x) \text{ modulo } G_{16}(x) = C_{16}(x)$$

$$C_{48}(x) \text{ modulo } G_{32}(x) = C_{32}(x)$$

It can be shown, by solving these equations, that:

$$I_{48}(x) = x^{47} + x^{46} + x^{43} + x^{42} + x^{39} + x^{37} + x^{34} + x^{32} + x^{31} +$$
$$x^{30} + x^{29} + x^{27} + x^{25} + x^{23} + x^{22} + x^{21} + x^{20} + x^{19} + x^{17} +$$
$$x^{16} + x^{15} + x^{11} + x^{10} + x^9 + x^8 + x^5 + x^4 + x^2 + x + 1.$$

and $$C_{48}(x) = x^{45} + x^{44} + x^{41} + x^{40} + x^{38} + x^{36} + x^{35} + x^{33} +$$
$$x^{31} + x^{30} + x^{29} + x^{27} + x^{25} + x^{23} + x^{22} + x^{21} + x^{20} + x^{19} +$$
$$x^{17} + x^{16} + x^{14} + x^{13} + x^{12} + x^7 + x^6 + x^3.$$

Figure 4:
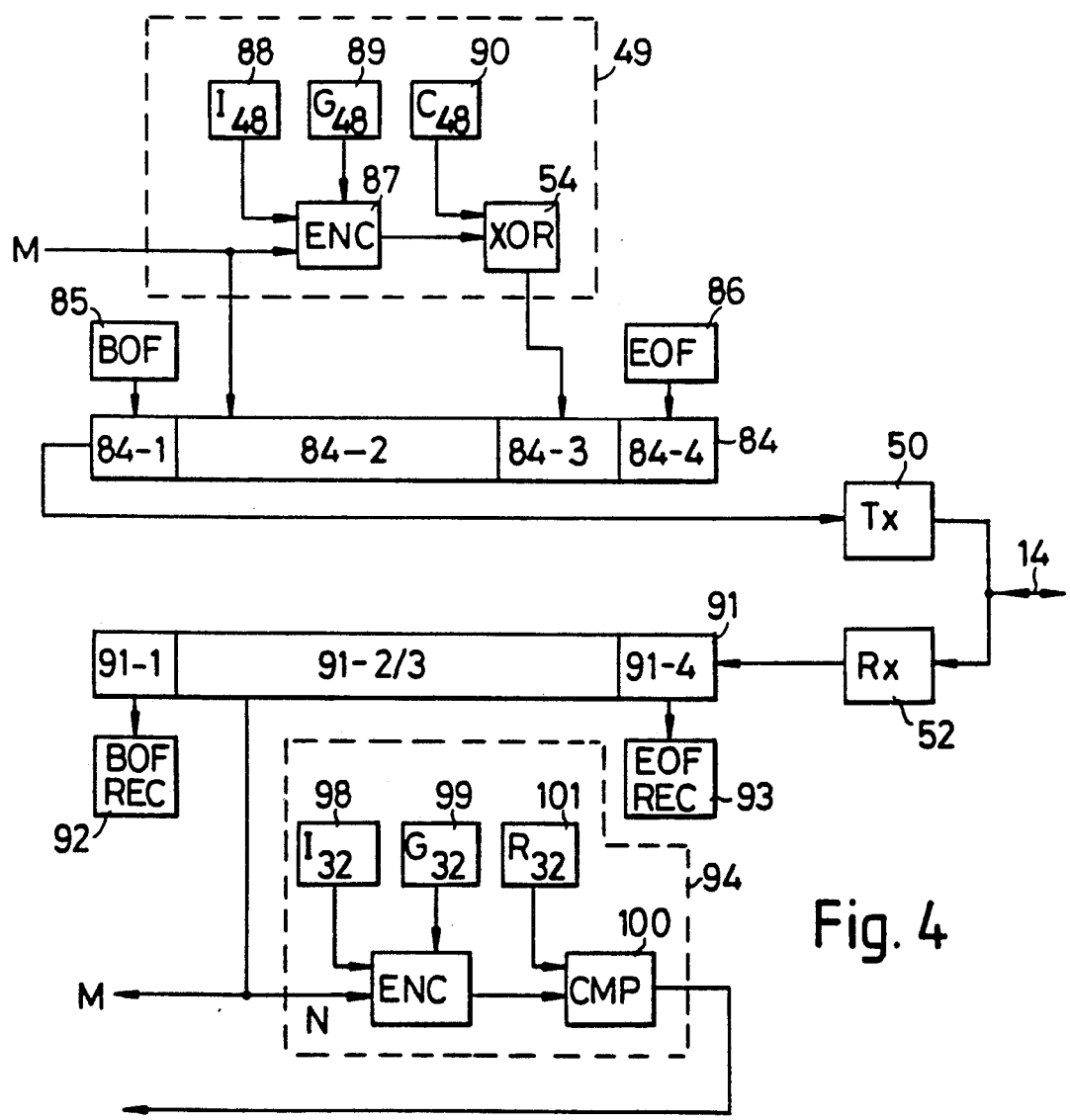
FIG. 4 is a block diagram of a node.
Figure 3:
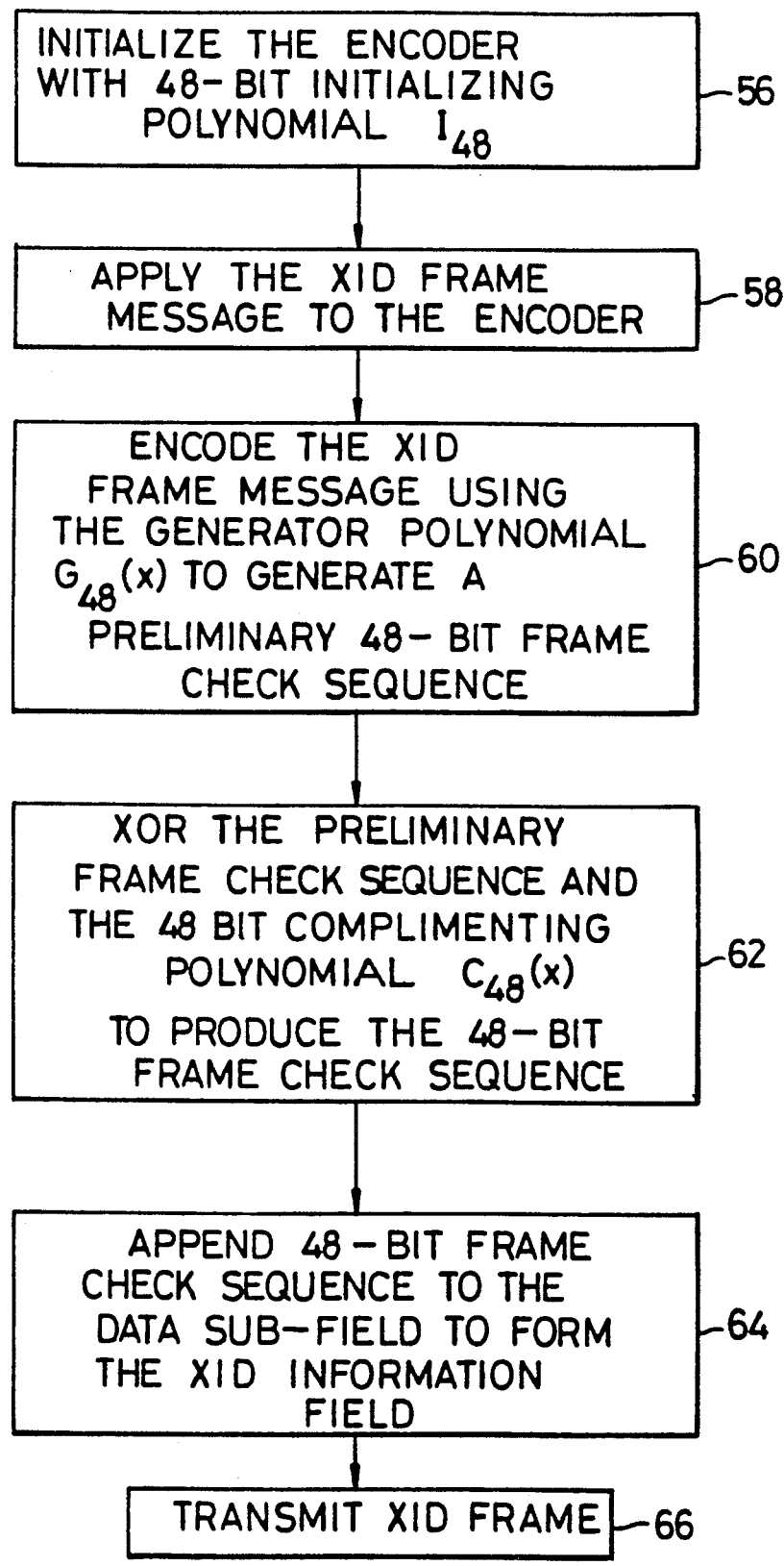
FIG. 3 is a flow chart of the operation of calculating a 48-bit frame check sequence.
Figure 4A:
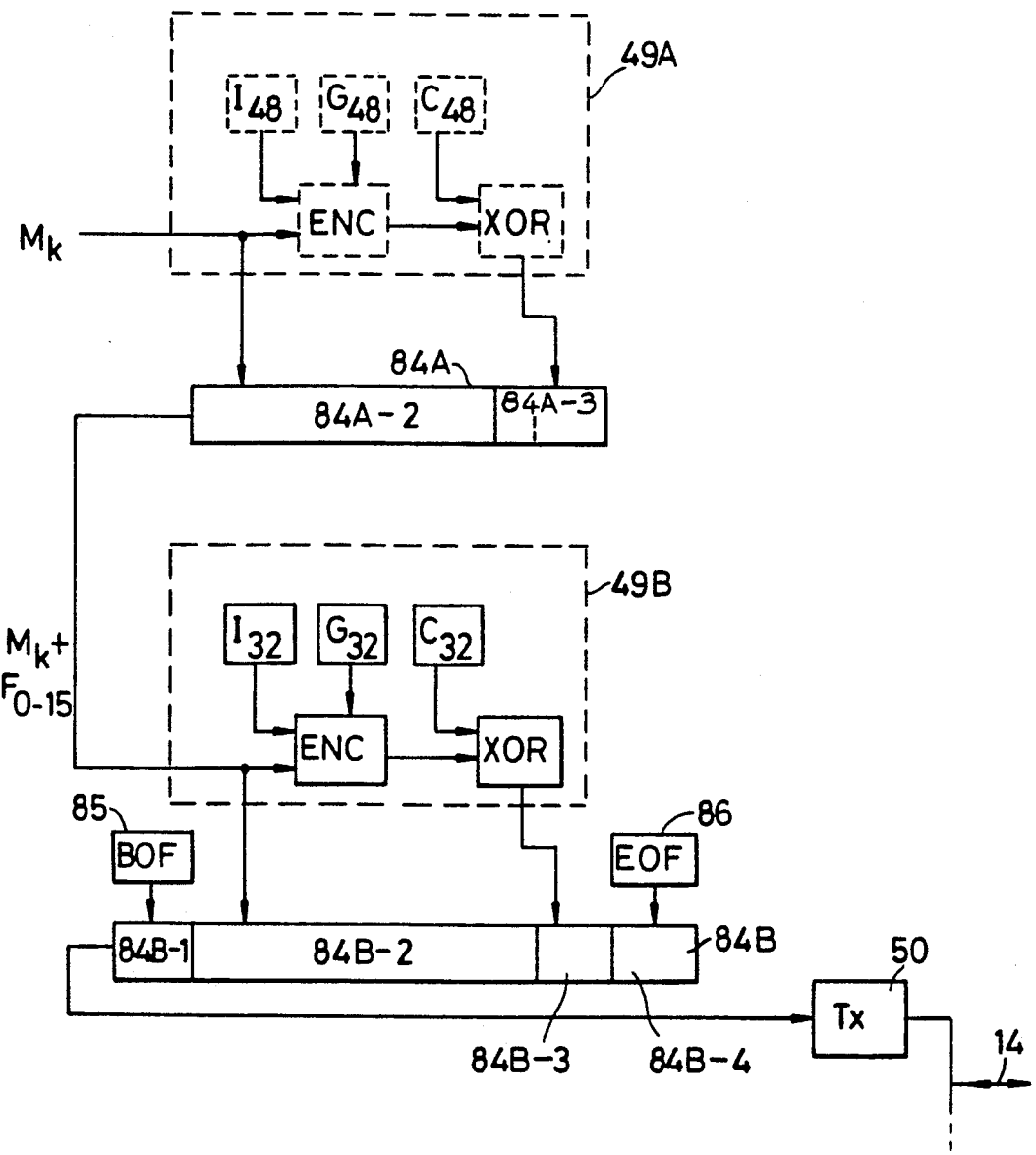
FIG. 4A is a block diagram of an alternative node.
Figure 5:
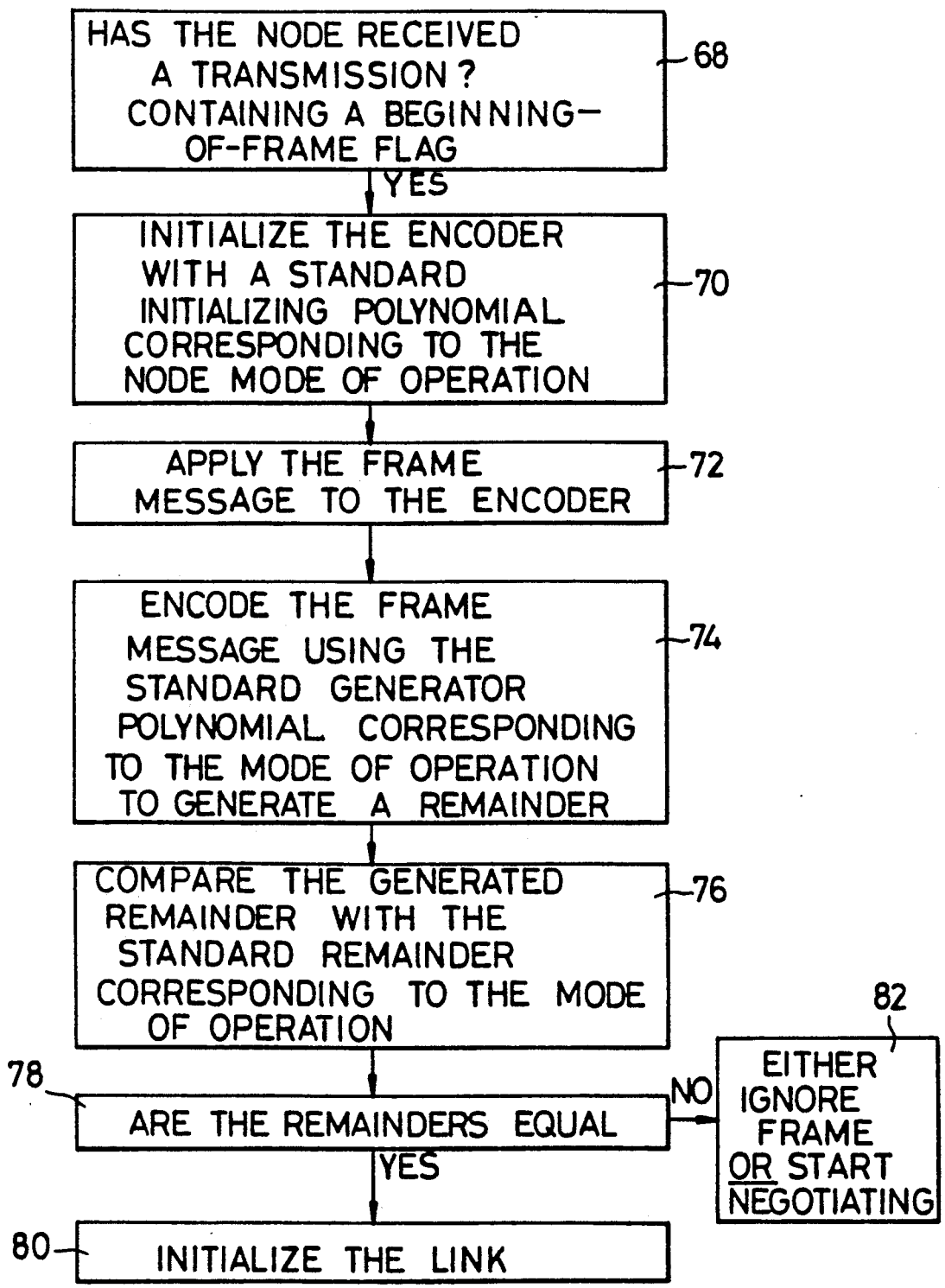
FIG. 5 is a flow chart of the operation of determining if a frame is error-free.

FIG. 4 is a block diagram of a node embodying the present system, and FIG. 3 is a flow diagram showing the operation of the present system in generating and transmitting a frame. It will be understood that the node of FIG. 4A is shown in a diagrammatic form intended to clarify the functional operation of the node. In practice, various of these functions can be performed in other ways: for example, a polynomial can be built into a circuit rather than being stored in a separate register feeding that circuit; and the various components of the frame to be transmitted can be fed directly to the transmitter circuitry rather than being first assembled together into a complete frame.

The frame to be transmitted is assembled in a frame register 84, having various sections corresponding to the various fields of a frame, as shown in FIG. 2. Section 84-1 is fed with a beginning-of-frame flag permanently stored in a beginning-of-frame register 85. Section 84-2 is fed with a frame message $M_k$ (step 58, FIG. 3); this section corresponds to the combination of the address field 42, the control field 43, and the XID information field 44. Section 84-3 is fed with the check frame sequence 45 (step 64), which is generated as discussed below. Section 84-4 is fed with an end-of-frame flag permanently stored in an end-of-frame register 86. The register 84 may be of variable length, to accommodate variable length frame messages $M_k$. When the frame has been assembled, it is fed to a transmit drive 50 and transmitted (step 66) onto the output line 14.

To generate the check frame sequence, the frame message $M_k$ is fed to a 48-bit encoder unit 49 which generates the frame check field as follows. First, an encoder 87 is initialized (step 56) with the initializing polynomial $I_{48}$ (see above) permanently stored in an initializing polynomial register 88. The frame message $M_k$ is then applied to the encoder 87, which encodes it (step 60) using the generator polynomial $G_{48}$ (see above) permanently stored in a generator polynomial register 89, to produce a preliminary frame check sequence $P_{48}(x)$ (modulo $G_{48}(x)$):

$$I_{48}*x^k + M_k*x^{48},$$

where k is the length of the message $M_k$. This preliminary frame check sequence is then added (XORed) (step 62) to the complementing polynomial $C_{48}$ (see above), permanently stored in a register 54, to produce the actual frame check sequence $F_{48}(x)$ (modulo $G_{48}(x)$):

$$I_{48}* x^k + M_k*x^{48} + C_{48}(x).$$

Considering now the reception of messages by the node, the incoming frame is received via a line receiver 52 and fed into a frame register 91, having various sections corresponding to the sections of register 84. When the beginning-of-frame flag is recognized by a beginning-of-frame recognition circuit 92 (step 68) as being in section 91-1, it is known that a full frame has been received, and the end of the frame is identified by an end-of-frame flag recognition circuit 93 which detects the end-of-frame flag in section 91-4. Between these two sections 91-1 and 91-4 there is a single message and check section 91-2/3 (corresponding to the two sections 84-2 and 84-3 of register 84). The register 91 may be of variable length, to accommodate variable length frames (that is, variable length messages between the two flags).

It should be noted that the message N which is processed on reception corresponds to the combination of the message $M_k$ together with the frame check sequence F generated on transmission. Thus $$N = M_k*x^{48} + F_{48}(x).$$

When the node 12 has received a frame starting with a beginning-of-frame flag, presumably the XID frame, it encodes it in an encoder unit 94 using a standard 32-bit or 16-bit frame check code. The encoder unit 94 is generally similar to the encoder 49. Following the ISO standard, if for example the node is operating in the 32-bit mode it initializes the encoder 97 (step 70) with the initializing polynomial $I_{32}$ (see above) permanently stored in an initializing polynomial register 98. The frame message N in section 91-2/3 of register 91 is then applied (step 72) to the encoder 97, which encodes it (step 74) using the generator polynomial $G_{32}$ (see above) permanently stored in a generator polynomial register 99, to produce a remainder $R(x)$.

If the frame is error-free, the remainder $R(x)$ is (modulo $G_{48}(x)$);

$$I_{32}*x^{k+48} + N*x^{32} = I_{32}*x^{k+48} [M_k * x^{48} + F_{48}(x)]*x^{32}.$$

Substituting the value of $F_{48}(x)$ set forth above and multiplying by $x^{32}$ yields:

$$I^{32}*x^{k+48} + M_k*x^{80} + I_{48}*x^{k+32} + M_k*x^{80} + C_{48}(x)*x^{32}.$$

Substituting the values of $I_{48}$ modulo $G_{32}$ and $C_{48}$ modulo $G_{32}$ set forth above yields:

$$I_{32}*x^{k+48} + M_k*x^{80} + I_{32}*x^{k+48} + M_k*x^{80} + C_{32}*x^{32}.$$

Adding the terms modulo 2 (that is, cancelling like terms), reduces the remainder to $$C_{32}*x^{32}$$

which is the standard remainder value, $R_{32}(x)$ [modulo $G_{32}(x)$], for the 32-bit mode of operation.

The encoder 94 then compares (step 76) the remainder so calculated with the standard remainder value $R_{32}(x)$ (see above), permanently stored in a standard remainder register 101, in a comparator 100. If the calculated and standard remainders are the same, the output of the comparator indicates that the frame is error-free.

The entire receiving circuitry—that is, the line receiver 52 and the units 91 to 94—constitutes a standard ISO receiver.

Similarly, using the 16-bit frame check code, an error-free frame remainder is the standard remainder $R_{16}(x)$.

Once the node determines that the frame is error-free, it node may use the information in the frame message to initialize the link (steps 78–80). Otherwise, the node determines that the frame contains errors. The node may then either ignore the frame and wait for a valid one or start a negotiation, depending on the network protocol (steps 78 and 82).

If the frame is a valid XID frame, the node may ignore the last 48 bits of the frame information field. In order to inform a receiving node that these last 48 bits of the information field are frame check sequence bits the transmitting node may include that information in the frame directly or it may place a predetermined marker 47 in the information field prior to the calculation of the frame check sequence to denote the end of the XID information field 44 and the beginning of the frame check sequence field 45 (FIG. 2). The marker is then protected by the frame check sequence and a receiving node will not thus confuse the marker with the frame message due to errors in transmission.

The 48-bit frame check sequence is used only when a communication link is initialized. Thus the 48-bit encoder is used relatively infrequently. It is therefore possible to perform the 48-bit encoding by software rather than by means of 48-bit hardware encoder as shown in FIG. 4. This has the advantage that it is not necessary to provide additional hardware. Performing the encoding by software is of course slower, and imposes an additional load on the operating system of the nodes, but since the 48-bit encoding is required relatively infrequently, this additional load will not normally be serious.

The communication link will automatically have a standard ISO 32-bit encoder and a standard ISO 32-bit decoder (assuming that is operates in the 32-bit mode). There will normally be a standard ISO 32-bit transmitter, which comprises a 32-bit encoder means for inserting the beginning-of-frame and end-of-frame fields, and a line driver. In many instances, this standard ISO transmitter will be of unitary construction with the only input being to the encoder; in other words, it will not be possible to generate the 48-bit frame of software and then feed it direct to the line driver in the ISO transmitter.

In order to avoid having to provide, for this relatively infrequent use, either a full 48-bit encoder and transmitter or software 48-bit encoding and a hardware line driver, the system shown in FIG. 4A may be used. In this system, the 48-bit encoding is performed in software to produce the check field, the check field is truncated by the deletion of its last 32 bits, and the message plus the truncated check field is fed into a standard ISO 32-bit transmitter. That transmitter generates, from the message plus the first 16 bits of the 48-bit check field, a 32-bit check field which is appended onto the end of the truncated 48-bit check field. The encoder in the ISO transmitter functions to regenerate precisely the deleted 32 bits of the 48-bit check field. (This can be shown to follow from the way in which the initializing, generating, and complementing polynomials $I_{48}$, $G_{48}$, and $C_{48}$ are obtained from the standard ISO 32-bit polynomials $I_{32}$, $G_{32}$, and $C_{32}$).

Referring to FIG. 4A, the message $M_k$ is fed to a first encoder unit 49A, which is a 48-bit encoder corresponding to the encoder 49 of FIG. 4 and is implemented in software. The result —the message $M_k$ and the 48-bit check field—is assembled in a register 84A. The message $M_k$ and the first high order adjacent to the end of the message $M_k$ 16 bits $F_{0-15}$ of the check field are fed from register 84A to a 32-bit encoder unit 49B, which forms part of a standard ISO transmitter. The message $M_k$ and the first 16 bits $F_{0-15}$ of the check field are fed into section 84B-2 of a register 84B, and the encoder unit 49B generates a 32-bit check sum for this message $M_k$ and the first 16 bits $F_{0-15}$ of the check field which is fed into (32-bit) section 84B-3 of register 84B. Thus the complete frame is assembled in register 84B and transmitted onto the line 14.

If the node operates in the 16-bit mode, then the same technique can be applied, with the 48-bit check frame being truncated by 16 bits and those deleted regenerated by passing the message plus truncated check field through the standard ISO 16-bit transmitter.

It will be realized that the standard ISO transmitter and receiver may be of unitary construction with a single encoder and set of polynomial registers which perform the functions of both the transmitter and the receiver encoder units.

Using the 48-bit frame check sequence a node at one end of a communication link is able to communicate initialization information to a node at the other end of the link, even if the nodes are operating in different modes. Thus the two nodes may initialize the link relatively quickly. The use of the 48-bit frame check sequence eliminates the transmission of various XID frames back and forth over the link in order to establish that the nodes can communicate, that is, that the nodes can operate in the same mode of operation. It also eliminates the transmission of numerous XID frames between nodes that cannot operate in the same mode, for example, a 32-bit node and a 16-bit node. Accordingly, nodes using the 48-bit frame check sequence can communicate their operating capabilities with one XID frame and the nodes then know they either can or cannot operate in the same mode.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A system for transmitting digital messages comprising:
    a transmitter encoder unit operating with a predetermined bit-length of 48 bits effective to produce a frame check sequence from a message and to append the frame check sequence to the message, the message and its appended frame check sequence being capable of being checked by a receiver encoder unit operating in a first mode having a shorter bit-length of 16 bits and by a receiver encoder unit operating in a second mode having a bit-length of 32 bits;
    a line driver for transmitting the message and its appended frame check sequence over a communication link;
    a line receiver for receiving the message and its appended frame check sequence from the communication link; and
    a receiver encoder unit for checking the message and its appended frame check sequence, the receiver encoder unit operating in one of the two modes.

2. The system of claim 1 wherein the frame check sequence is a 48-bit frame check sequence and the first mode is a 16-bit mode and the second mode is a 32-bit mode.

3. The system of claim 2 wherein the transmitter encoder unit comprises:
    an encoder for encoding the message with a generator polynomial;
    means for initializing the encoder with an initialization polynomial; and
    means for adding a complementing polynomial to the encoded message effective to produce the frame check sequence.

4. The system of claim 3 wherein:
    the generator polynomial is the product of the 16-bit and the 32-bit standard generator polynomials specified by the International Standard Organization (ISO) High-level Data Link Control (HDLC) protocol;
    the initialization polynomial equals $x^{47} + x^{46} + x^{43} + x^{42} + x^{39} + x^{37} + x^{34} + x^{32} + x^{31} + x^{30} + x^{29} + x^{27} + x^{25} + x^{23} + x^{22} + x^{21} + x^{20} + x^{19} + x^{17} + x^{16} + x^{15} + x^{11} + x^{10} + x^9 + x^8 + x^5 + x^4 + x^2 + x + 1$; and
    the complementing polynomial equals $x^{45} + x^{44} + x^{41} + x^{40} + x^{38} + x^{36} + x^{35} + x^{33} + x^{31} + x^{30} + x^{29} + x^{27} + x^{25} + x^{23} + x^{22} + x^{21} + x^{20} + x^{19} + x^{17} + x^{16} + x^{14} + x^{13} + x^{12} + x^7 + x^6 + x^3$.

5. The system of claim 4 wherein the receiver encoder unit is effective to operate in accordance with the 32-bit mode of the ISO HDLC protocol.

6. The system of claim 4 wherein the receiver encoder unit is effective to operate in accordance with the 16-bit mode of the ISO HDLC protocol.

7. A network node for transmitting digital messages comprising:
    means for generating a 48-bit frame check sequence from a message, the message and its appended 48-bit frame check sequence being capable of being checked by a 16-bit receiver encoder unit and by a 32-bit receiver encoder unit;
    means for appending the high order 16 bits of the 48-bit frame check sequence to the message;
    a transmitter encoder unit effective to operate in accordance with the 32-bit mode of the International Standard Organization (ISO) High-level Data Link Control (HDLC) protocol, the transmitter encoder unit further effective to receive the message and its 16-bit frame check sequence segment and to generate, using standard 32-bit ISO generator codes, a 32-bit frame check sequence therefrom;

means for appending the 32-bit frame check sequence to the 16-bit frame check sequence segment, the combination of the 16-bit frame check sequence segment and appended 32-bit frame check sequence being equal to the 48-bit frame check sequence; and a line driver for transmitting the message, its 16-bit frame check sequence segment, and the appended 32-bit frame check sequence over a communication link.

8. The network node of claim 7 wherein the means for generating a 48-bit frame check sequence comprises:

means for encoding the message with a generator polynomial; and means for initializing the means for encoding with an initialization polynomial; and means for adding a complementing polynomial to the encoded message effective to produce the 48-bit frame check sequence.

9. The network node of claim 8 wherein:

the generator polynomial is the product of the 16-bit and the 32-bit standard generator polynomials specified by the ISO HDLC protocol;

the initialization polynomial equals $x^{47} + x^{46} + x^{43} + x^{42} + x^{39} + x^{37} + x^{34} + x^{32} + x^{31} + x^{30} + x^{29} + x^{27} + x^{25} + x^{23} + x^{22} + x^{21} + x^{20} + x^{19} + x^{17} + x^{16} + x^{15} + x^{11} + x^{10} + x^{9} + x^{8} + x^{5} + x^{4} + x^{2} + x + 1$; and the complementary polynomial equals $x^{45} + x^{44} + x^{41} + x^{40} + x^{38} + x^{36} + x^{35} + x^{33} + x^{31} + x^{30} + x^{29} + x^{27} + x^{25} + x^{23} + x^{22} + x^{21} + x^{20} + x^{19} + x^{17} + x^{16} + x^{14} + x^{13} + x^{12} + x^{7} + x^{6} + x^{3}$.

10. The network node of claim 9 wherein the means for generating a 48-bit frame check sequence is embodied in software.

11. A network node for transmitting digital messages comprising:

means for generating a 48-bit frame check sequence from a message, the message and its appended 48-bit frame check sequence being capable of being checked by a 16-bit receiver encoder unit and by a 32-bit receiver encoder unit;

means for appending the high order 32 bits of the 48-bit frame check sequence to the message;

a transmitter encoder unit effective to operate in accordance with the 16-bit mode of the International Standard Organization (ISO) High-level Data Link Control (HDLC) protocol, the transmitter encoder unit further effective to receive the message and its 32-bit frame check sequence segment and to generate, using standard 16-bit ISO generator codes, a 16-bit frame check sequence therefrom;

means for appending the 16-bit frame check sequence to the 32-bit frame check sequence segment, the combination of the 32-bit frame check sequence segment and appended 16-bit frame check sequence being equal to the 48-bit frame check sequence; and a line driver for transmitting the message, its 32-bit frame check sequence segment, and the appended 16-bit frame check sequence over a communication link.

12. The network node of claim 11 wherein the means for generating a 48-bit frame check sequence comprises:

means for encoding the message with a generator polynomial; and means for initializing the means for encoding with an initialization polynomial; and means for adding a complementing polynomial to the encoded message effective to produce the 48-bit frame check sequence.

13. The network node of claim 12 wherein:

the generator polynomial is the product of the 16-bit and the 32-bit standard generator polynomials specified by the ISO HDLC protocol;

the initialization polynomial equals $x^{47} + x^{46} + x^{43} + x^{42} + x^{39} + x^{37} + x^{34} + x^{32} + x^{31} + x^{30} + x^{29} + x^{27} + x^{25} + x^{23} + x^{22} + x^{21} + x^{20} + x^{19} + x^{17} + x^{16} + x^{15} + x^{11} + x^{10} + x^{9} + x^{8} + x^{5} + x^{4} + x^{2} + x + 1$; and the complementing polynomial equals $x^{45} + x^{44} + x^{41} + x^{40} + x^{38} + x^{36} + x^{35} + x^{33} + x^{31} + x^{30} + x^{29} + x^{27} + x^{25} + x^{23} + x^{22} + x^{21} + x^{20} + x^{19} + x^{17} + x^{16} + x^{14} + x^{13} + x^{12} + x^{7} + x^{6} + x^{3}$.

14. The network node of claim 13 wherein the means for generating a 48-bit frame check sequence is embodied in software.

* * * * *